(12) United States Patent
Bastide et al.

(10) Patent No.: US 10,839,323 B2
(45) Date of Patent: *Nov. 17, 2020

(54) LOGICAL PRODUCTIVITY VIEW MANAGEMENT

(71) Applicant: INTERNATIONAL BUSINESS MACHINES CORPORATION, Armonk, NY (US)

(72) Inventors: Paul R. Bastide, Boxford, MA (US); Dale M. Schultz, Limerick, ME (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/788,070

(22) Filed: Jun. 30, 2015

(65) Prior Publication Data

US 2017/0004436 A1  Jan. 5, 2017

(51) Int. Cl.
*G06Q 10/06* (2012.01)
*G08B 21/06* (2006.01)
*G08B 21/18* (2006.01)
*H04L 29/08* (2006.01)

(52) U.S. Cl.
CPC ..... *G06Q 10/063114* (2013.01); *G08B 21/06* (2013.01); *G08B 21/182* (2013.01); *H04L 67/22* (2013.01)

(58) Field of Classification Search
CPC ............................................ G06Q 10/063114
See application file for complete search history.

(56) References Cited

U.S. PATENT DOCUMENTS

| | | | |
|---|---|---|---|
| 2003/0139902 A1 | 7/2003 | Geib et al. | |
| 2008/0141126 A1* | 6/2008 | Johnson | G06F 17/212 |
| | | | 715/273 |
| 2009/0030767 A1 | 1/2009 | Morris et al. | |
| 2010/0121849 A1 | 5/2010 | Goeldi | |
| 2013/0018955 A1 | 1/2013 | Thaxton et al. | |
| 2013/0046826 A1* | 2/2013 | Stanton | G06Q 10/10 |
| | | | 709/204 |
| 2013/0223611 A1 | 8/2013 | Kohler et al. | |

(Continued)

OTHER PUBLICATIONS

International Business Machines Corporation, "List of IBM Patents or Patent Applications Treated As Related," submitted Jun. 10, 2016, 2 Pages.

(Continued)

*Primary Examiner* — Andre D Boyce
(74) *Attorney, Agent, or Firm* — Rakesh Roy

(57) ABSTRACT

A method for productivity view management may include receiving, by a processor, a plurality of collaborative artifacts for a user and organizing the plurality of collaborative artifacts in a list based on a predetermined order. The method may also include analyzing, by the processor, the list of collaborative artifacts using a predetermined criterion and determining a view management fatigue factor threshold for the user. The method may further include automatically inserting, by the processor, a downtime artifact within the list of collaborative artifacts based on analyzing the list of collaborative artifacts to prevent the user from exceeding the view management fatigue factor threshold.

16 Claims, 6 Drawing Sheets

(56) References Cited

U.S. PATENT DOCUMENTS

2017/0004696 A1 1/2017 Bastide

OTHER PUBLICATIONS

Spira, Jonathan B., et al.; "The Cost of Not Paying Attention: How Interruptions Impact Knowledge Worker Productivity," Basex, Inc. Report, 2005, pp. 1-21.

Marketing Pilgrim; "Facebook Looks to Improve News Feed Content Quality," Retrieved from the Internet on Jul. 2, 2015, pp. 1-8 <http://www.marketingpilgrim.com/2013/08/facebook-looks-to-improve-news-feed-content-quality.html>.

Wikipedia; "Deep learning," Retrieved from the Internet, Last modified on Jan. 29, 2015, pp. 1-16 <http://en/ wikipedia.org/wiki/Deep_learning>.

Wikipedia; "Natural language processing," Retrieved from the Internet, Last modified on Jan. 23, 2015, pp. 1-11 <http://en.wikipedia.org/wiki/Natural_language_processing>.

Costagliola, Gennaro, et al.; "A Novel Approach for Attention Management in E-learning Systems," Conference Paper, 2010, pp. 1-7.

IBM Corporation; "Analyizing survey text: a brief overview," IBM SPSS Text Analytics for Surveys, 2010, pp. 1-12.

IBM Corporation; "IBM SPSS Statistics: What's New," SPSS software, 2015, pp. 1-8.

IBM Corporation; "IBM SPSS Statistics Editions," IBM SPSS Statistics, 2015, pp. 1-8.

Slashdot; "Facebook Launches Advanced AI Effort to Find Meaning in Your Posts," Retrieved from the Internet on Jul. 2, 2015, pp. 1-17 <http://tech.slashdot.org/story/13/09/21/1831239/facebook-launches-ai-effort-to-find-meaning-in-your-posts>.

Mediatec Publishing Inc.; "Downtime Management: Surfing May Not Be Slacking," Talent Management Magazine, Retrieved from the Internet on Jun. 6, 2014, pp. 1-5 <http://talentmgt.com/articles/view/downtime_management_surfing_may_not_be_slacking>.

Psychology Today; "Has Technology Killed Down Time," Retrieved from the Internet on Feb. 6, 2015, pp. 1-6 <https://www.psychologytoday.com/blog/inviting-monkey-tea/201403/has-technology-killed-down-time>.

Sanebox; "Email Overload in the Enterprise: The science behind email productivity," No Publication Date, pp. 1-8.

Sanebox; "Your Email Without SaneBox," Retrieved from the Internet on Jul. 2, 2015, pp. 1-10 <http://www.sanebox.com/I/how-it-works#sthash.hEqocKRM.SmV6aodi.dpbs>.

* cited by examiner

LOGICAL PRODUCTIVITY VIEW MANAGEMENT

BACKGROUND

Aspects of the present invention relate to electronic communications, such as mail clients and online networks, and more particularly to a method, system and computer program product for logical productivity view management of a list of artifacts or collaborative artifacts of a user of an online communications system or network in an activity stream or inbox of a user.

Mail Clients and Online Networks are a universal mechanism to connect people and information in logical and organized ways which enable sharing and processing of information between the users. The most common mechanisms of sharing and processing information are the inbox, wall, activity stream, timeline, or profile. These mechanisms enable a user to rapidly share information with others and gather information from others in the networks. With mobile phones and the prevalence of messaging applications, there has developed a need to be constantly connected, and corresponding need to be constantly occupied. However, these mechanisms can also provide a constant influx of information that can result in little if any break for the user or the user's mind. It is believed that the mind needs recess periods during the day, like a child, and not have to direct ones thought processes or energy toward any particular object or event. The mind needs to be able to flow freely from thought to thought, or simply rest in no thought. Downtime between tasks allows the mind to rest. Gaps during the day provide time to take a much-needed break from mental activity. This downtime allows the user to come back renewed for the next object of his attention. With constant attention at something all the time, a user can become mentally exhausted and while more time is spent focusing on tasks, the user in fact becomes, qualitatively, less productive. Accordingly, there is a need to provide a mechanism that automatically provides a mental break or downtime for users to the constant influx of information and preforming tasks associated with such information.

BRIEF SUMMARY

According to one embodiment of the present invention, a method for productivity view management may include receiving, by a processor, a plurality of collaborative artifacts for a user and organizing the plurality of collaborative artifacts in a list based on a predetermined order. The method may also include analyzing, by the processor, the list of collaborative artifacts using a predetermined criterion and determining a view management fatigue factor threshold for the user. The method may further include automatically inserting, by the processor, a downtime artifact within the list of collaborative artifacts based on analyzing the list of collaborative artifacts to prevent the user from exceeding the view management fatigue factor threshold.

According to another embodiment of the present invention, a system for productivity view management may include a processor and a module operating on the processor for productivity view management. The module may be configured to perform a set of functions that may include receiving a plurality of collaborative artifacts for a user and organizing the plurality of collaborative artifacts in a list based on a predetermined order. The set of functions may also include analyzing the list of collaborative artifacts using a predetermined criterion. The set of functions may additionally include determining a view management fatigue factor threshold for the user and automatically inserting a downtime artifact within the list of collaborative artifacts based on analyzing the list of collaborative artifacts to prevent the user from exceeding the view management fatigue factor threshold.

According to another embodiment of the present invention, a computer program product for productivity view management may include a computer readable storage medium having program instructions embodied therewith. The computer readable storage medium is not a transitory medium per se. The program instructions may be executable by a device to cause the device to perform a method that may include receiving a plurality of collaborative artifacts for a user and organizing the plurality of collaborative artifacts in a list based on a predetermined order. The method may also include analyzing the list of collaborative artifacts using a predetermined criterion and determining a view management fatigue factor threshold for the user. The method may additionally include automatically inserting a downtime artifact within the list of collaborative artifacts based on analyzing the list of collaborative artifacts to prevent the user from exceeding the view management fatigue factor threshold.

In some other embodiments of the present invention and in combination with any of the above embodiments, analyzing the list of artifacts may include scanning a content of each artifact to determine a set of characteristics associated with each artifact. The set of characteristics may include but is not necessarily limited to a complexity of each collaborative artifact, a length or size of each collaborative artifact, a formality of each collaborative artifact and whether the collaborative artifact requires an action or response by the user. A weight may be assigned to each collaborative artifact based on at least one of the set of characteristics.

In some other embodiments of the present invention and in combination with any of the above embodiments, the method or set of functions may also include detecting the user opening a first collaborative artifact and determining a fatigue factor associated with the first collaborative artifact based on at least a time duration spent by the user processing the first collaborative artifact. The method or set of functions may additionally include determining if the view management fatigue factor threshold has been exceeded by the fatigue factor associated with the first collaborative artifact and allowing the user to open and process at least a second collaborative artifact until the view management fatigue factor threshold is exceeded. The method or set of functions may further include performing a predetermined action in response to the view management fatigue factor threshold being exceeded.

In some other embodiments of the present invention and in combination with any of the above embodiments, the method or set of functions may further include determining that the user completed a particular task and determining a fatigue factor associated with the particular task based on at least a time duration spent by the user on the particular task. The method or set of functions may also include determining if the view management fatigue factor threshold is exceeded by the fatigue factor associated with the particular task and automatically performing a predetermined action in response to the fatigue factor threshold being exceeded.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
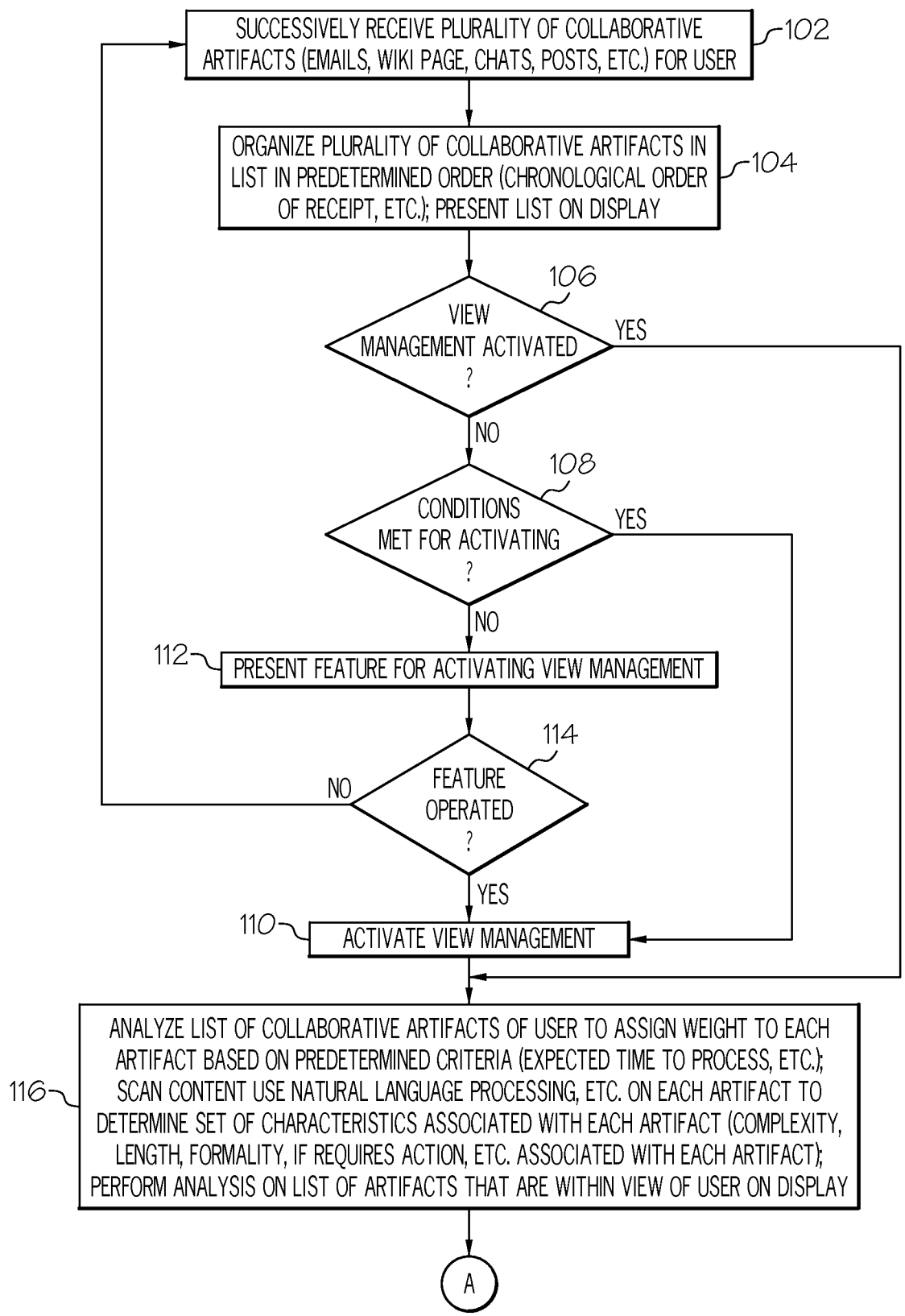
FIGS. 1A-1C (collectively FIG. 1) are a flow chart of an example of a method for productivity view management in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
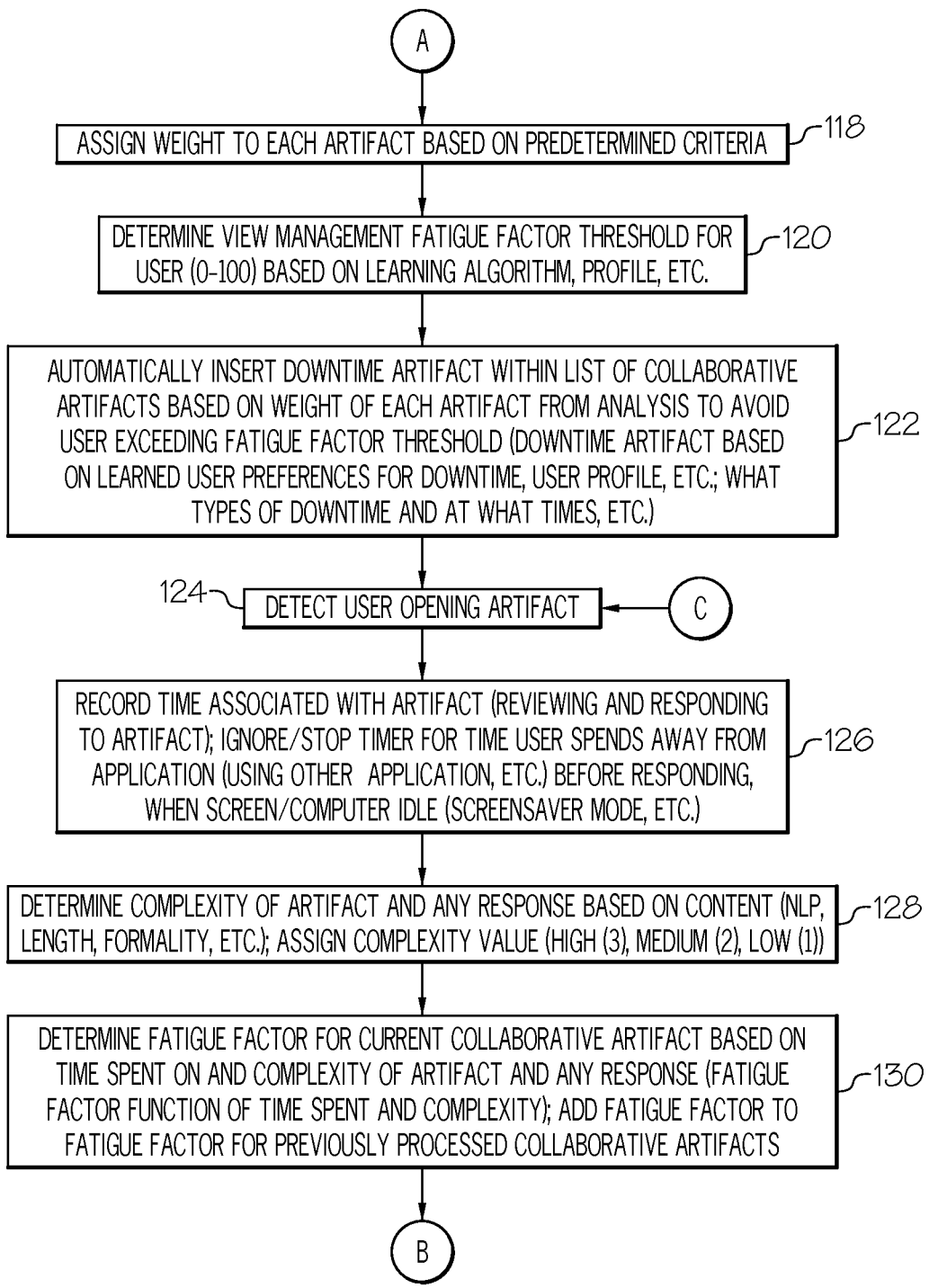
Figure 1C:
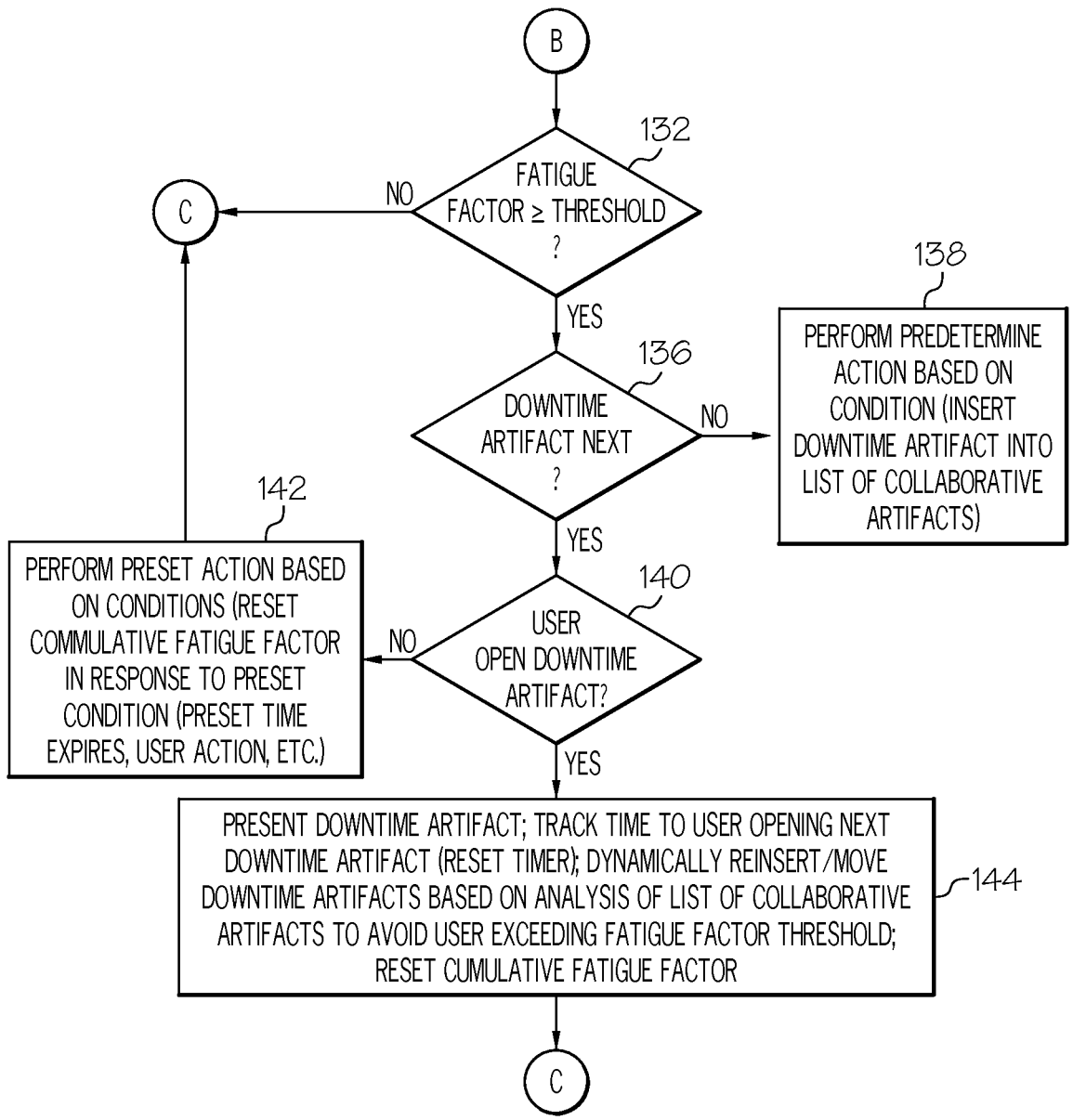

FIGS. 1A-1C (collectively FIG. 1) are a flow chart of an example of a method 100 for productivity view management in accordance with an embodiment of the present invention. In block 102, a plurality of artifacts or collaborative artifacts for a user may be successively received by a communications device of the user. The communications device of the user may include but in not necessarily limited to a client computer system, portable computer system, tablet computer, smartphone or other type communications device configured to perform the functions or operations described herein. Examples of artifacts or collaborative artifacts may include but are not limited to emails, wiki pages, chats, posts to a network, events in an activity stream or similar communications between multiple participants in a network.

In block 104, the plurality of collaborative artifacts may be organized in a list in a predetermined order. For example, the collaborative artifacts may be organized in the list in chronological order according to when the each collaborative artifact was received by the communications device of the user. The most recently received collaborative artifact may be listed first. The list of collaborative artifacts may be presented on a display of the user's communications device. Not all collaborative artifacts that have been received by the user's communications device may be viewable in the display. The area of the display for presenting the viewable collaborative artifacts may only be large enough for viewing a certain number of collaborative artifacts. A size of the display area may be increased or decreased by the user to view more or fewer collaborative artifacts. An example of a display 300 of a communications device including a plurality of collaborative artifacts will be described in more detail with reference to FIG. 3 below.

In a block 106, a determination may be made if the productivity view management application or feature has been activated on the user's communications device. The productivity view management application may be a separate application operating on the user's communications device or may be a feature incorporated in a communications application or module, such as an email application, wiki page, chat, social media application or other communications mechanism or arrangement. If the productivity view management application or module has been activated, the method 100 may advance to block 116 in FIG. 1B. If the productivity view management application or module has not been activated, the method 100 may advance to block 108. In block 108, a determination may be made whether a condition or conditions have been met for activating the productivity view management application or module. If one or more conditions have been met for activating the productivity view management application, the method 100 may advance to block 110 and the productivity view management application or feature may be activated. The method 100 may then advance to block 116 in FIG. 1B. Examples of conditions for activating the productivity view management application or feature may include but is not limited to the application being activated at certain times of the day, may be used for a preset time duration during the day, may be used on certain days of the week and/or certain times during those days, or as determined by a particular schedule, or other time constraints or conditions. Other examples of conditions may be that the user has a preset number of unread collaborative artifacts in an inbox or activity stream. The productivity view management application may be applied to a specified number of artifacts. For instance, the productivity view management feature may only be used on those artifacts that are viewable on the display of the user's communications device. The productivity view management application or feature may also be activated by a manager, team leader or by voting between members of a group or organization to activate the productivity view management application, feature or module.

If conditions have not been met for activating the productivity view management feature in block 108, the method 100 may advance to block 112. In block 112, a feature for activating the productivity view management feature or application may be presented on the display of the user's communications device. Examples of the feature for activating the productivity view management application or feature may be an icon, item in a drop down menu or any mechanism for activating an application or feature as may be used in the computing arts.

In block 114, a determination may be made whether the feature for activating the productivity view management feature or application has been activated. If the feature for activating the productivity view management feature has not been activated or operated, the method 100 may return to block 102. If the feature has been operated, the productivity view management application or feature may be activated in block 110 and the method 100 may advance to block 116.

In block 116, the list of collaborative artifacts of the user may be analyzed using a predetermined criterion or criteria to assign a weight to each artifact based on the predetermined criterion or criteria. Examples of predetermined criteria may include but is not necessarily limited to an expected time to process each collaborative artifact, length of a particular email or message, time to read a particular email, past time spent of reading an email, time spent with an artifact in focus. Analyzing each artifact may include scanning a content of each artifact using natural language processing (NLP) or other processing to determine a set of characteristics associated with each collaborative artifact. The set of characteristics associated with each artifact may correlate to an expected processing time of each artifact. A non-exhaustive set of characteristics that may be associated with each artifact may include a complexity, a length or size, formality or formalness of language used, does the artifact require a response or other action. An example of complexity may include a range from the artifact simply including one or a few words to multiple sentences and paragraphs. Complexity may also be related to the formality or formalness which may be associated with the language used, for example, does the artifact include technical terms or terms that may be unique to a particular technology or subject matter. Formality or formalness may also be associated with language or terms used in certain communications, such as business or professional communications, communications going outside an organization may be more complex and require more time than internal communications. Complexity may also be related to length. Length or size of the artifact may include the number words, number and length of sentences or number and length of paragraphs.

For each characteristic of the set of characteristics, the artifact may be provided a number or value. For example, a lowest level of complexity may be a 1 and a highest level of complexity 5. Similarly, a number from 1 to 5 may be assigned to the artifact based on each of the length and formality. A zero or a 5 may be assigned to the artifact if a response or other action is required by the artifact. The numbers or values corresponding to each of the set of characteristics of a particular collaborative artifact may be summed to provide a weight for the particular artifact.

In block 118, a weight may be assigned to each collaborative artifact based on the analysis of each collaborative artifact. Accordingly, a particular weight may be assigned to each collaborative artifact that may correspond to the expected processing time for each collaborative artifact. As previously described, the set of characteristics associated with each artifact may correlate to an expected processing time of each artifact. The weight assigned to each artifact may be based on one or more of the set of characteristics.

Assigning a weight to each collaborative artifact may include comparing the set of characteristics for each of the collaborative artifacts with one another and assigning the weight to each collaborative artifact based on the set of characteristics or values or numbers assigned to each of the set of characteristics as described above. Accordingly, a particular collaborative artifact may be assigned a higher weight compared to another collaborative artifact in response to the particular collaborative artifact including at least one of a higher complexity value or number, a longer length, more formal language or requiring a response or other action.

In block 120, a view management fatigue factor threshold may be determined for the user. This view management fatigue factor threshold may be determined based on a learning algorithm, from a profile of the user or from some other source. The view management fatigue threshold may be defined as a level of substantially continuous mental attention to or concentration on a particular task or set of tasks by the user and that when the threshold is reached or exceeded, it may be beneficial to provide some sort of mental relief or diversion of the user's attention to improve the user's productivity for another task or set of tasks that may require a similar exertion of attention or mental concentration. As an example, the view management fatigue threshold may have a range from 0-100. The higher the threshold for a particular user, the longer time or more tasks requiring a high level of attention and/or mental concentration may be performed by the particular user before some relief or downtime may improve productivity. A user may specify a view management fatigue threshold. For example, tasks, emails or messages may have a particular level based on the complexity similar to that previously described. The user may specify that he can only process a certain number of a particular level of tasks or messages before reaching the view management fatigue factor. In another embodiment, the system may determine the view management fatigue threshold based on feedback from the user or monitoring the user's activity and tuning to a user specific threshold.

In block 122, a downtime artifact may be automatically inserted within the list of collaborative artifacts based on the weight of each artifact from the analysis to avoid the user exceeding the view management fatigue factor threshold. As an example, assume the user has a view management fatigue factor threshold of 70 and the first two collaborative artifacts have a combined weight of 60 and the third collaborative artifact has a weight of 15. Opening and processing the third collaborative artifact will cause the user to exceed the view management fatigue factor threshold. Therefore, the method or system will automatically insert a downtime artifact between the second collaborative artifact and the third collaborative artifact.

A downtime artifact may be defined as any artifact that may provide the user a mental break or relief from the previous level of attention or mental concentration. The downtime artifact does not require as rigorous a thought process. Examples of downtime artifacts may include but is not necessarily limited to an article of interest to the user, a humorous cartoon, joke or story, a photograph of a particular image, such as scenic view, sports scores of interest to the user, or other artifact that may provide the user a mental break. Downtime artifacts for the user may be determined based on learned preferences for downtime for the user, from a user profile or other sources. Downtime artifacts may be of different types at different time of the day or based on other circumstances or conditions. For example, a downtime artifact in the afternoon may be related to upcoming traffic conditions. A morning downtime artifact may be related to a cafeteria lunch menu.

In block 124, the user opening a collaborative artifact may be detected. In block 126, an actual time associated with processing the artifact may be recorded. For example, a time reviewing and responding to the collaborative artifact may be monitored or tracked. An artifact processing timer may be started when the user opens the collaborative artifact. The artifact processing timer may be stopped for any time the user may spend away from the application, such as using another application or detecting that there is no activity from the user, i.e., in a computer idle or screensaver mode.

In block 128, a complexity of the artifact and any response prepared by the user may be determined based on the content of the artifact and any response. The complexity may be determined by scanning the content using NLP. The complexity may be determined based on a length or size of the artifact and any response, formality, or other characteristics similar to those previously described. A complexity value may be assigned to the artifact and any response based on the complexity. For example, complexity values in the range of 1-3 may be assigned to the artifact and any response. A 1 may correspond to a lowest complexity, a 2 may correspond to a medium complexity, and a 3 may correspond to a highest complexity.

In block 130, a fatigue factor for the current collaborative artifact that has been processed by the user may be determined based on a time spent on processing the current collaborative artifact and a complexity of the collaborative artifact and the time and complexity of any response. The fatigue factor for the current collaborative artifact may be added to fatigue factors for any previously processed collaborative artifacts to provide a cumulative fatigue factor for all previously processed collaborative artifacts and the current collaborative artifact processed by the user.

In block 132, a determination may be made it the fatigue factor or cumulative fatigue factor is greater than or equal to the view management fatigue factor threshold for the user. If the fatigue factor or cumulative fatigue factor is not greater than or equal to the view management fatigue threshold, the method 100 may return to block 124 and user may process another collaborative artifact in the list of collaborative artifacts. The method 100 may proceed at block 124 similar to that previously described. If the fatigue factor is greater than or equal to the threshold, the method 100 may advance to block 136.

In block 136, a determination may be made if a next artifact in the list of collaborative artifacts is the downtime artifact that was previously inserted based on analysis of the list of collaborative artifacts. If the next artifact in the list of collaborative artifacts is not the downtime artifact, the method 100 may advance to block 138. In block 138, a predetermined action may be performed based on one or more conditions. For example, the downtime artifact may be moved and reinserted into the list of collaborative artifacts or another downtime artifact may be inserted in the list. Examples of other predetermined actions that may be performed in response to detecting that the view management fatigue factor of the user has exceeded the threshold will be described with reference to FIG. 2.

In block 136, if the next artifact in the list of collaborative artifacts is the downtime artifact, the method 100 may advance to block 140. In block 140, a determination may be made whether the user opened the downtime artifact. If the user does not open the downtime artifact, the method 100 may advance to block 142. In block 142, a preset action may be performed based on one or more conditions. For example, the cumulative fatigue factor may be reset in response to a certain condition being met. An example of the certain condition may include a preset time period expiring without any user action, a computer idle state, etc., or the user may perform an action, such as skipping the downtime artifact and opening another collaborative artifact in the list of collaborative artifacts. The method 100 will then advance to block 124 and the method 100 may then proceed similar to that previously described.

In block 140, if the user opens the downtime artifact, the method 100 may advance to block 144. In block 144, the downtime artifact may be presented to the user. A time duration to the user opening a next downtime artifact may be tracked. Accordingly, a downtime timer may be reset to track the time between the user opening downtime artifacts. After viewing or processing a downtime artifact, another downtime artifact or artifacts may be inserted or dynamically reinserted or moved within the list of collaborative artifacts based on the analysis of the list of collaborative artifacts to avoid the user exceeding the fatigue factor threshold similar to that previously described. The cumulative fatigue factor may be reset. The method 100 may then return to block 124 and the method 100 may proceed similar to that previously described. Accordingly, the productivity view management feature may automatically and dynamically insert, move and reinsert downtime artifacts in a list of collaborative artifacts to prevent a user from exceeding a view management fatigue factor threshold. The downtime artifact provides a mental relief to the user for improving productivity of the user for performing subsequent tasks requiring mental concentration.

Figure 2:
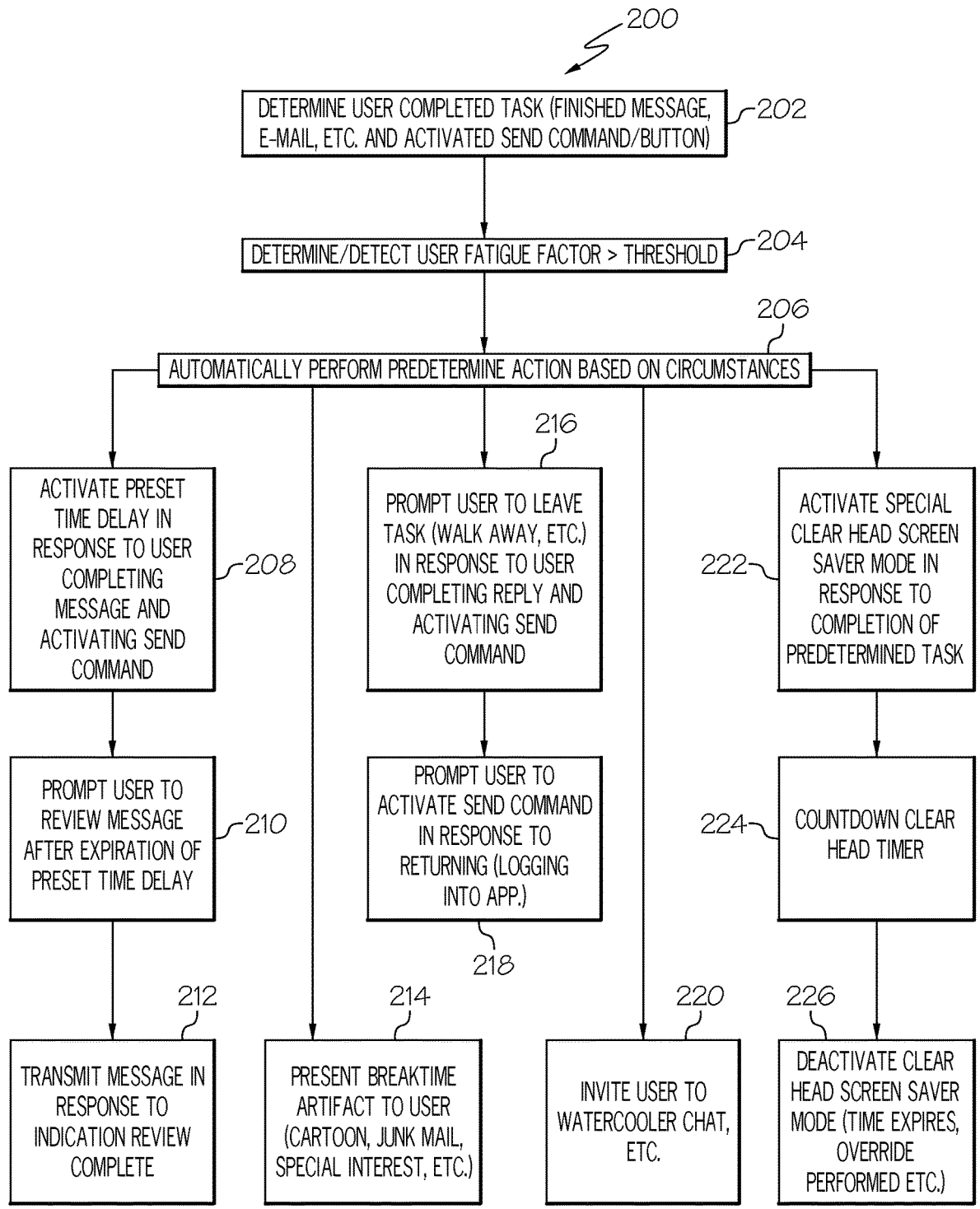
FIG. 2 is a flow chart of an example of a method for productivity view management in accordance with another embodiment of the present invention.

FIG. 2 is a flow chart of an example of a method 200 for productivity view management in accordance with an embodiment of the present invention. In block 202, a determination may be made that a user has completed a task. For example, a determination may be made that the user finished processing or drafting a message, e-mail or other communication and activated a send command or button or performed some other task or group of tasks.

In block 204, a determination may be made or it may be detected that the user's view management fatigue factor has exceeded the threshold. In block 206, a predetermined action may be performed based on a set of circumstances in response to detecting that the user's fatigue factor exceeds the threshold. The set of circumstance may include the particular task the user may have completed, any predetermined actions based on the user's profile or particular actions the user may have selected for a break time or downtime artifact.

In block 208, the predetermined action that may be automatically performed may be activating a preset time delay in response to the user completing a message and activating the send command. In block 210, the user may be prompted to review the message after expiration of the preset time delay, and in block 212, the message may be transmitted in response to an indication that the review by the user is complete.

In block 214, the predetermined action that may be automatically performed may be presenting the user a break time artifact in response to determining or detecting that the user's view management fatigue factor has exceeded the threshold. The break time artifact may be similar to the downtime artifact previously described. Examples of break time artifacts may include but are not necessarily limited to a cartoon, junk mail, a special interest article, or other entertaining artifact that provides the user a break and less mentally demanding content to think about.

In block 216, the predetermined action that may be automatically performed may be prompting the user to leave the task for a predetermined time period in response to determining that the user's fatigue factor has exceeded the threshold. For example, the user may be prompted to walk away, take a walk or perform some other action away from the task after completing the task or a complex reply and activating a send command. The method 200 refrains from performing the send command unless overridden by the user. The method 200 may log the user out of the application. In block 218, after the predetermined time period, the user may be prompted to activate a send command in response to the user returning or logging back into the application if automatically logged out by the method or system.

In block 220, the predetermined action automatically performed may be to invite the user to a water cooler chat in response to the user's view management fatigue factor being exceeded. The water cooler chat may be any chat session that may involve a more casual theme, such as what is playing at local theatres, what is on television tonight, a good book to read, or other light topic that may provide the user's mind a diversion and minimal mental exertion.

In block 222, the predetermined action automatically performed may be activating a special clear head screen saver mode in response to the user completing a certain task and determining or detecting that the user's fatigue factor exceeds the threshold. Examples of the special clear head screen saver mode may include but is not necessarily limited to present a serene or relaxing image on the user's display, such as landscape or a short video, music video or other entertaining content may be presented to the user. In block 224, a countdown clear head timer may be activated. In block 226, the clear head screen saver mode may be deactivated in response to the countdown clear head timer expiring or the user performing an override procedure.

Figure 3:
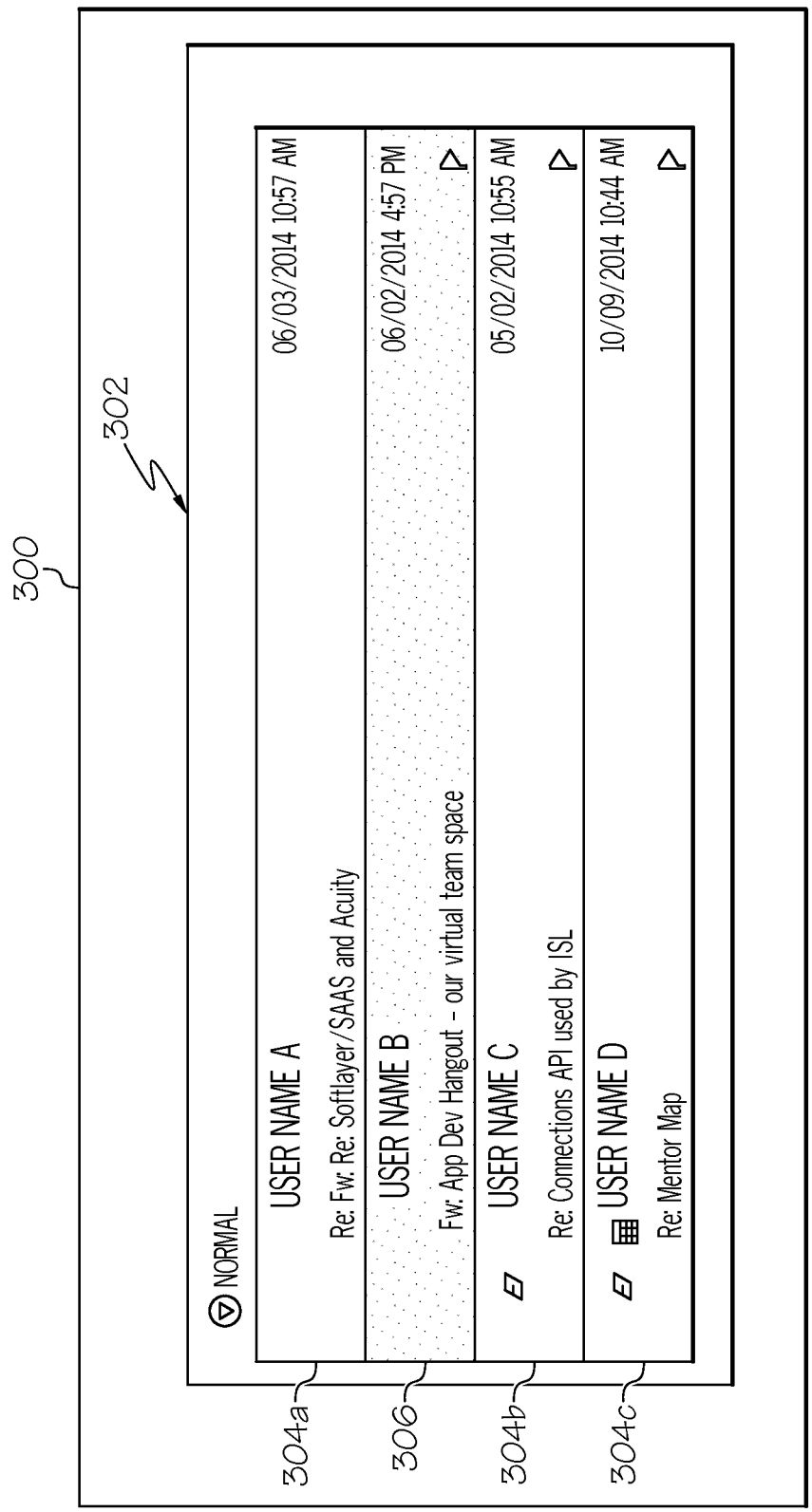
FIG. 3 is an example of a display including a list of collaborative artifacts and a downtime artifact that has been inserted into the list for productivity view management in accordance with an embodiment of the present invention.

FIG. 3 is an example of a display 300 including a list 302 of collaborative artifacts 304a, 304b and 304c and a downtime artifact 306 that has been inserted into the list for productivity view management in accordance with an embodiment of the present invention. The downtime artifact 306 has been automatically inserted into the list 302 of collaborative artifacts 304a-304c to avoid exceeding a fatigue factor threshold of the user based on the analysis of the collaborative artifacts 304a-304c and assigning weights to each collaborative artifact similar to that previously described. The downtime artifact 306 may be distinguished from the collaborative artifacts 304a-304c. As illustrated in the example of FIG. 3, the downtime artifact 306 may be highlighted to distinguish the downtime artifact 306 from the collaborative artifacts 304a-304c. The downtime artifact 306 may be distinguished from the collaborative artifacts 304a-304c by any suitable arrangement.

Figure 4:
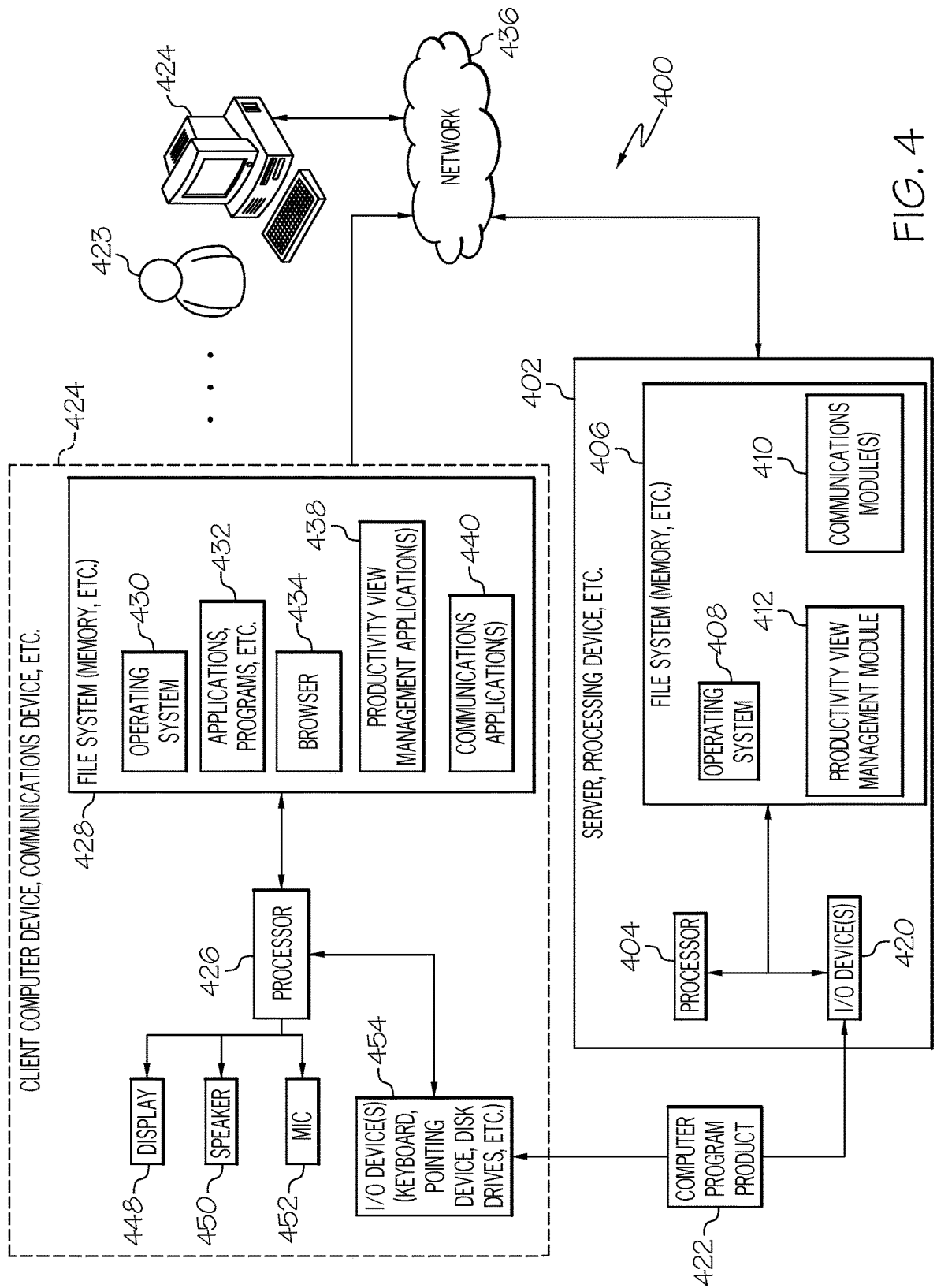
FIG. 4 is a block schematic diagram of an example of a system for productivity view management in accordance with an embodiment of the present invention.

FIG. 4 is a block schematic diagram of an example of a system 400 for productivity view management in accordance with an embodiment of the present invention. The methods 100 of FIGS. 1A-1C and 200 in FIG. 2 may be embodied in and performed by the system 400. The system 400 may include a processing device 402. The processing device 402 may be a server or similar processing device. The processing device 402 may include a processor 404 for controlling operation of the processing device 402 and for performing functions, such as those described herein with respect to methods 100 and 200 in FIGS. 1A-1C and 2. The processing device 402 may also include a file system 406 or memory. An operating system 408, applications and other programs may be stored on the file system 406 for running or operating on the processor 404. One or more networking or communications modules 410 or systems may also be stored on the file system 406 and may be compiled and run on the processor 404 to perform the functions or operations described herein. The networking or communications module 410 may be any type of online communications mechanism or system for online communications or conversations.

A productivity view management module 412 may also be stored on the file system 406. The method 100 of FIGS. 1A-1C and 200 of FIG. 2 may be embodied in the productivity view management module 410 and performed by the processor 404 when the productivity view management module 410 is compiled and run on the processor 404. The productivity view management module 412 may operate in conjunction with the communications module 410. The productivity view management module 412 may be a separate component from the communications module 410 or in another embodiment, the productivity view management module 412 may be a component of the communications module 410.

The processing device 402 may also include one or more input devices, output devices or combination input/output devices, collectively I/O devices 420. The I/O devices 420 may include, but are not necessarily limited to, a keyboard or keypad, pointing device, such as a mouse, disk drive and any other devices to permit a user to interface with and control operation of the processing device 402 and to access the social networking module 410 or system. At least one of the I/O devices 420 may be a device to read a computer program product, such as computer program product 422. The computer program product 422 may be similar to that described in more detail herein. The communications module 410 and productivity view management module 412 may be loaded on the file system 406 from a computer program product, such as computer program product 422.

A member of a network, such as a social network, or user 423 of the system 400 may use a computer system 424 or communications device to access the processing device 402 or server and communications module 410 and productivity view management module 412. The computer system 424 or communications device may be any sort of communications device including a mobile or handheld computer or communications device. The computer system 424 may include a processor 426 to control operation of the computer system 424 and a file system 428, memory or similar data storage device. An operating system 430, applications 432 and other programs may be stored on the file system 428 for running or operating on the processor 426. A web or Internet browser 434 may also be stored on the file system 428 for accessing the processing device 402 or server via a network 436. The network 436 may be the Internet, an intranet or other private or proprietary network.

A productivity view management application 438 may also be stored on the file system. The method 100 in FIGS. 1A-1C and the method 200 in FIG. 2 or at least portions of the methods 100 and 200 may be embodied in and performed by the productivity view management application 438. The productivity view management application 438 may be compiled and run on the processor 426 to perform functions similar to those described with respect to methods 100 and 200.

One or more communications applications 440 may also be stored on the file system 428. The one or more communications applications 440 may be any type of online communications mechanism for online communications or conversations. The productivity view management application 438 may be a separate component from the communications application 440 as shown in the exemplary embodiment in FIG. 4 or in another embodiment, the productivity view management application 438 may be a component of the communications application 440.

The communications application 440 and the productivity view management application 438 operating on the computer system 424 may interface with or operate in conjunction with the communications module 410 and productivity view management module 412 on the processing device 402 or server to perform the functions and operations described herein. Accordingly, communications application 440 and productivity view management application 438 operating on the computer system 424 may perform some of the functions and operations of the method 100 and the method 200 and communications module 410 and productivity view management module 412 operating on the server 402 may perform other functions of the method 100 and the method 200. Some embodiments of the present invention may include only the communications module 410 and productivity view management module 412 on the processing device 402 or server, and other embodiments may include only the communications application 440 and productivity view management application 438 operating on the client computer system 424 or communications device.

The client computer system 424 may also include a display 448, a speaker system 450, and a microphone 452 for voice communications. The collaborative artifacts and downtime artifacts similar to that illustrated in the exemplary display 300 in FIG. 3 may be presented on the display 448 for controlling operating the communications module 410 and productivity view management module 412 and/or productivity view management application 438 and communications application 440 and for performing the operations and functions described herein.

The computer system 424 may also include one or more input devices, output devices or combination input/output devices, collectively I/O devices 454. The I/O devices 454 may include a keyboard or keypad, pointing device, such as a mouse, disk drives and any other devices to permit a user, such as user 423, to interface with and control operation of the computer system 424 and to access the communications application 440 and communications module or system 410 on server 402. The I/O devices 454 may also include at least one device configured to read computer code from a computer program product, such as computer program product 422.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for productivity view management, comprising:
   a processor;
   a module operating on the processor for productivity view management, the module being configured to perform a set of functions comprising:
   receiving a plurality of electronic collaborative artifacts of an online communications system for a user, wherein each collaborative artifact of the plurality of collaborative artifacts comprises an email, a wiki page, an electronic chat, a post to the online communications system, or an event in an electronic activity stream;
   organizing the plurality of collaborative artifacts in a list based on a predetermined order;
   presenting, on an electronic display, at least a portion of the list of the plurality of collaborative artifacts based on a determined display area of the electronic display;
   scanning a content of each collaborative artifact using natural language processing to concurrently determine a numerical value for each of a set of characteristics associated with each collaborative artifact, the set of characteristics comprising a complexity of each collaborative artifact, a length of each collaborative artifact, a formality of each collaborative artifact and whether the collaborative artifact requires an action by the user, wherein the numerical value determined for each of the set of characteristics associated with each collaborative artifact correlates to an expected processing time of each collaborative artifact;
   assigning a weight to each collaborative artifact based on comparing the numerical value determined for each of the set of characteristics for each collaborative artifact with one another, wherein the assigned weight corresponds to at least the expected processing time for the user to process each collaborative artifact;
   determining a view management fatigue factor threshold for the user;
   in response to identifying, based on the assigned weight of each collaborative artifact within the list of the plurality of collaborative artifacts, a specific collaborative artifact after which the determined view management fatigue factor threshold for the user is exceeded, automatically inserting an electronic downtime artifact within the list of the plurality of collaborative artifacts after the identified specific collaborative artifact to prevent the user from exceeding the determined view management fatigue factor threshold; and
   graphically distinguishing, on the electronic display, the automatically inserted downtime artifact from the plurality of collaborative artifacts within the list of the plurality of collaborative artifacts.

2. The system of claim 1, wherein the predetermined criterion comprises the expected processing time for each collaborative artifact.

3. The system of claim 1, wherein the set of functions further comprises:
   detecting the user opening a first collaborative artifact;
   determining a fatigue factor associated with the first collaborative artifact based on at least a time duration spent by the user processing the first collaborative artifact;
   determining if the view management fatigue factor threshold has been exceeded by the fatigue factor associated with the first collaborative artifact;
   allowing the user to open and process at least a second collaborative artifact until the view management fatigue factor threshold is exceeded; and
   performing a predetermined action in response to the view management fatigue factor threshold being exceeded.

4. The system of claim 3, wherein the predetermined action comprises:
   determining whether a next collaborative artifact in the list of collaborative artifacts is the downtime artifact; and
   inserting the downtime artifact or another downtime artifact next in the list of collaborative artifacts in response to the next collaborative artifact in the list of collaborative artifacts being other than the downtime artifact.

5. The system of claim 4, wherein the set of functions further comprises:
   determining whether the user opened the downtime artifact or the other downtime artifact;
   tracking a time duration to the user opening a next downtime artifact in response to the user opening the downtime artifact or the other downtime artifact; and
   resetting a cumulative fatigue factor in response to the user not opening the downtime artifact or the other downtime artifact within a preset time period.

6. The system of claim 1, wherein a particular collaborative artifact is assigned a higher weight than another collaborative artifact in response to the particular collaborative artifact including at least one of a higher complexity, a long length, more formality or requiring an action by the user.

7. The system of claim 1, wherein the set of functions further comprises:
   determining that the user completed a particular task;
   determining a fatigue factor associated with the particular task based on at least a time duration spent by the user on the particular task;
   determining if the view management fatigue factor threshold is exceeded by the fatigue factor associated with the particular task; and
   automatically performing a predetermined action in response to the fatigue factor threshold being exceeded.

8. The system of claim 7, wherein determining that the user has completed the particular task comprises determining that the user has completed a message and activated a send command, the set of functions further comprising:
   activating a preset time delay before transmitting the message;
   prompting the user to review the message in response to expiration of the preset time delay; and
   transmitting the message in response to an indication that the review of the message is complete.

9. The system of claim 7, wherein the predetermined action comprises one of:
   presenting a break time artifact to user;
   inviting the user to a water cooler chat; and
   activating a clear head screen save mode for a preset time period or performance of an override procedure.

10. The system of claim 1, further comprising distinguishing the inserted downtime artifact in the list of collaborative artifacts.

11. The system of claim 1, wherein the downtime artifact comprises an artifact that provides the user a mental break or relief from a previous level of attention or mental concentration.

12. The system of claim 1, further comprising determining the downtime artifact based on learned preferences for downtime for the user.

13. The system of claim 1, wherein organizing the plurality of collaborative artifacts in the list based on the predetermined order comprises organizing the list in chronological order according to when each collaborative artifact was received by a communications device of the user.

14. The system of claim 1, wherein determining the view management fatigue factor threshold comprises determining a level of substantially continuous mental attention to or concentration on a particular task or set of tasks by the user that when met or exceeded, a mental relief or diversion of the user's attention from the particular task or set of tasks improves the user's productivity for another task or another set of tasks.

15. A computer program product for productivity view management, the computer program product comprising a computer readable storage medium having program instructions embodied therewith, wherein the computer readable storage medium is not a transitory medium per se, the program instructions being executable by a device to cause the device to perform a method comprising:
   receiving a plurality of electronic collaborative artifacts of an online communications system for a user, wherein each collaborative artifact of the plurality of collaborative artifacts comprises one of an email, a wiki page, an electronic chat, a post to the online communications system, or an event in an electronic activity stream;
   organizing the plurality of collaborative artifacts in a list based on a predetermined order;
   presenting, on an electronic display, at least a portion of the list of the plurality of collaborative artifacts based on a determined display area of the electronic display;
   scanning a content of each collaborative artifact using natural language processing to concurrently determine a numerical value for each of a set of characteristics associated with each collaborative artifact, the set of characteristics comprising a complexity of each collaborative artifact, a length of each collaborative artifact, a formality of each collaborative artifact and whether the collaborative artifact requires an action by the user, wherein the numerical value determined for each of the set of characteristics associated with each collaborative artifact correlates to an expected processing time of each collaborative artifact;
   assigning a weight to each collaborative artifact based on comparing the numerical value determined for each of the set of characteristics for each collaborative artifact with one another, wherein the assigned weight corresponds to at least the expected processing time for the user to process each collaborative artifact;
   determining a view management fatigue factor threshold for the user;
   in response to identifying, based on the assigned weight of each collaborative artifact within the list of the plurality of collaborative artifacts, a specific collaborative artifact after which the determined view management fatigue factor threshold for the user is exceeded, automatically inserting an electronic downtime artifact within the list of the plurality of collaborative artifacts after the identified specific collaborative artifact to prevent the user from exceeding the determined view management fatigue factor threshold; and
   graphically distinguishing, on the electronic display, the automatically inserted downtime artifact from the plurality of collaborative artifacts within the list of the plurality of collaborative artifacts.

16. The computer program product of claim 15, wherein the predetermined criterion comprises an expected processing time for each collaborative artifact.

* * * * *